(12) United States Patent
Danby et al.

(10) Patent No.: US 8,683,658 B2
(45) Date of Patent: Apr. 1, 2014

(54) AIRBAG CLAMP

(75) Inventors: Michael Richard Danby, Stoney Creek (CA); Todd Hemingway, Metamora, MI (US); Peter Murphy, Dundas (CA)

(73) Assignee: Tinnerman Palnut Engineered Products, Inc., Brunswick, OH (US)

( * ) Notice: Subject to any disclaimer, the term of this patent is extended or adjusted under 35 U.S.C. 154(b) by 174 days.

(21) Appl. No.: 12/454,812

(22) Filed: May 22, 2009

(65) Prior Publication Data

US 2010/0101057 A1    Apr. 29, 2010

Related U.S. Application Data

(60) Provisional application No. 61/128,507, filed on May 22, 2008.

(51) Int. Cl.
    *F16L 33/02*    (2006.01)

(52) U.S. Cl.
    USPC .... 24/16 R; 24/20 CW; 24/20 EE; 24/23 EE; 24/279; 24/280; 24/570; 280/728.2

(58) Field of Classification Search
    USPC ..... 24/16 R, 20 CW, 20 EE, 23 EE, 279, 280, 24/570; 280/728.2
    See application file for complete search history.

(56) References Cited

U.S. PATENT DOCUMENTS

| | | | | |
|---|---|---|---|---|
| 366,532 A | * | 7/1887 | Tuerk | 24/279 |
| 499,760 A | * | 6/1893 | Sherman | 24/279 |
| 1,373,673 A | * | 4/1921 | Ritter | 24/279 |
| 1,547,208 A | * | 7/1925 | Farmer | 24/23 EE |
| 1,981,371 A | * | 11/1934 | Prindle | 24/23 W |
| 2,053,739 A | * | 9/1936 | Prindle | 24/23 W |
| 2,118,158 A | * | 5/1938 | Carlson | 24/23 W |
| 2,269,285 A | * | 1/1942 | Ott | 24/23 W |
| 2,760,262 A | * | 8/1956 | Homan | 29/513 |
| 3,105,402 A | * | 10/1963 | Tofflemire | 72/387 |
| 3,750,241 A | * | 8/1973 | Bootha | 24/279 |
| 4,160,510 A | * | 7/1979 | Wardell, Jr. | 220/2.1 A |
| 4,451,955 A | | 6/1984 | Kern et al. | |
| 4,473,925 A | * | 10/1984 | Jansen | 24/23 W |
| 4,501,356 A | * | 2/1985 | Urban et al. | 206/83.5 |
| 4,773,129 A | * | 9/1988 | Muhr | 24/20 R |
| 4,882,814 A | * | 11/1989 | Takahashi | 24/20 R |
| 4,935,992 A | | 6/1990 | Due | |

(Continued)

OTHER PUBLICATIONS

Intl Sea Rpt/Written Opin, Jul. 14, 2009, Tinnerman Palnut Engineer.

*Primary Examiner* — Robert J Sandy
*Assistant Examiner* — David Upchurch
(74) *Attorney, Agent, or Firm* — McDonald Hopkins LLC

(57) ABSTRACT

The present invention is directed to an apparatus and method for utilizing an airbag clamp for securing an airbag onto an inflating tube of an airbag system. An embodiment of the present invention includes a body, a first engaging portion, and a second engaging portion. The body may be capable of surrounding the device, wherein the body may include a first end and a second end that are capable of moving towards each other. The first engaging portion may be located at a first end, wherein the first engaging portion may include at least one plate. The second engaging portion may be located at the second end, wherein the second engaging portion may include at least one plate. The engaging portions may be capable of being fitted together and the plates may be capable of being fastened together to secure the clamp around the material and device.

25 Claims, 11 Drawing Sheets

(56) References Cited

U.S. PATENT DOCUMENTS

| | | | |
|---|---|---|---|
| 4,996,749 A * | 3/1991 | Takahashi | 24/20 R |
| 5,073,765 A * | 12/1991 | Denner | 336/210 |
| 5,193,846 A | 3/1993 | Allard | |
| 5,433,138 A * | 7/1995 | Choinski et al. | 92/128 |
| 5,664,295 A * | 9/1997 | Kume et al. | 24/20 R |
| 5,819,376 A * | 10/1998 | Kovalsky et al. | 24/23 R |
| 5,881,437 A * | 3/1999 | Lilley | 24/20 CW |
| 6,343,407 B1 * | 2/2002 | Muto et al. | 24/20 R |
| 6,438,801 B1 * | 8/2002 | Yamada | 24/20 R |
| 7,028,556 B2 | 4/2006 | Powell | |
| 7,243,956 B2 * | 7/2007 | Brockway | 285/236 |
| 2006/0278060 A1 | 12/2006 | Shigenaga | |
| 2007/0035123 A1 | 2/2007 | Holt et al. | |

* cited by examiner

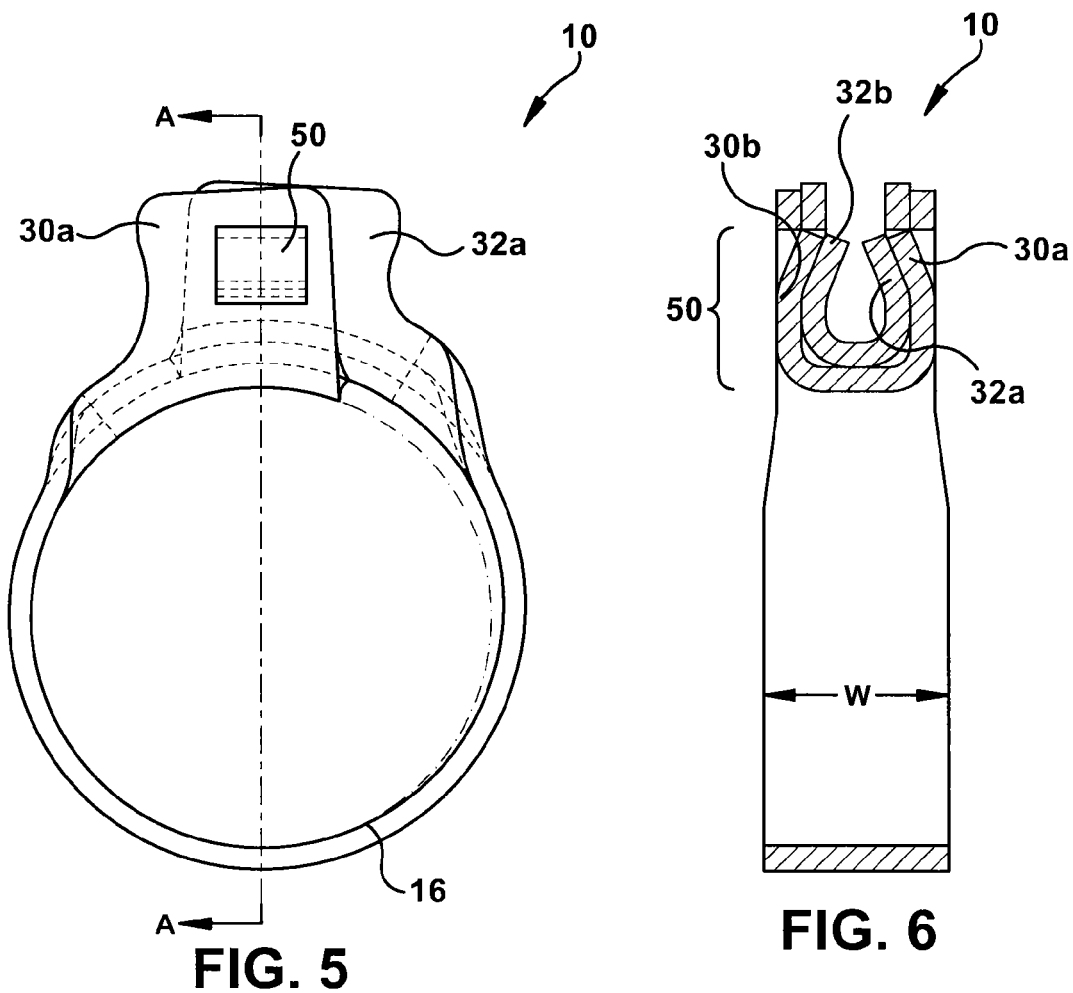

AIRBAG CLAMP

CROSS-REFERENCE TO RELATED APPLICATION

This application claims benefit from U.S. Provisional Patent Application No. 61/128,507, entitled "Airbag Clamp," filed on May 22, 2008, which is hereby incorporated in its entirety by reference.

FIELD OF THE INVENTION

The present invention generally relates to a clamp and a method for securing a clamp to an airbag to an inflating device.

BACKGROUND

Automobile safety regulations in the United States and globally have increased and remain an important concern for automobile manufacturers. In 1984, the U.S. government required all cars produced after Apr. 1, 1989 to have driver's side airbags. Dual front airbags were required in automobiles in 1998. Airbags consist of a flexible and inflatable envelope. Airbags are commonly used for cushioning against hard interior objects, such as steering wheels, in the event of a crash.

In a vehicle equipped with an air bag system, the airbag is instantly inflated in the event of a collision to protect the occupant from injury. The airbag is typically inflated by pressurized gas from an inflating tube mounted within the vehicle. Typically, airbag systems are designed to inflate the airbag within 20 to 40 milliseconds after the initial impact. The pressurized gas supplied to inflate the airbag within such a short period of time produces forces tending to pull and separate the airbag from the inflating tube. If the airbag is separated from the inflating tube, the airbag may not inflate or only partially inflate and, as a result, fail to adequately prevent the occupant's impact with hard interior objects of the vehicle, such as a steering wheel, door or the like.

To resist these forces, a clamping device of considerable strength must be provided to insure safety of the occupant. Ring clamps are typically used to secure the airbag to the inflating tube. These ring clamps are positioned around the inflating tube and the airbag to clamp the airbag to the inflating tube. However, these ring clamps are problematic for a number of reasons. First, during inflation of the airbag, these ring clamps tend to slip off of the inflating tube. Others have attempted to cure this problem by attaching a hook-like device to the inflating tube to prevent the ring clamp from sliding off of the inflating tube. However, this solution is costly and is only a preventive measure rather than curing the deficiencies of the clamps.

Second, these ring clamps are locked in a closed position by crimping or otherwise locking the ring clamp. However, the crimping or locking occurs in the same direction of the load path. In other words, the ring clamp is locked in the same direction as the applied force, which is typically a direction parallel to the clamp's circumference. As a result, the residual clamp load of these clamps is miniscule in view of the initial compression load applied to these ring clamps.

FIG. 12 illustrates a prior art clamp tested by applying different initial clamp loads and determining the residual load. As shown in FIG. 12, the residual clamp load is about 5% of the initial compression load. Therefore, these ring clamps are unreliable in maintaining connection of the airbag to the inflating tube, especially if the occupant contacts the airbag with a high amount of force.

As a result of the relatively low residual clamp load, manufacturers are forced to use expensive metal materials, such as high grade stainless steel. Mild steels, which typically cost less, were thought to be incapable of adequately resisting the forces caused by the nearly instantaneous inflation of the airbag. Therefore, these prior art ring clamps were relatively costly to manufacture.

The installation of these ring clamps is also deficient. The compression load used in installing these clamps varies widely and cannot be consistently applied. In addition, automobile manufacturers are unable to effectively record and track the installation of the clamps.

Therefore, a need exists for an improved clamp and method for installing clamps onto airbag inflating devices. While discussed in terms of use of clamps on airbag inflating devices, this is for illustration purpose only, and this invention should not be deemed as limited to the field of air bag systems. The clamps and methods for installing the clamps are applicable to many other fields as will be appreciated by a person of ordinary skill in the art.

BRIEF DESCRIPTION OF THE DRAWINGS

Objects and advantages together with the operation of the invention may be better understood by reference to the following detailed description taken in connection with the following illustrations, wherein:

FIG. 5 illustrates a front view of the clamp of FIG. 1 secured in a compressed state or closed position.

FIG. 6 illustrates a cross-sectional side view of the clamp of FIG. 5 taken along line A-A.

SUMMARY OF INVENTION

Figure 1:
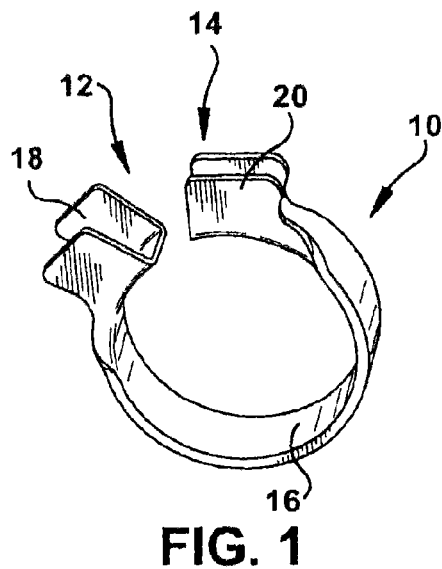
FIG. 1 illustrates a perspective view of a clamp in a relaxed state or open position in an embodiment of the present invention.

The present invention is directed to an apparatus and method for utilizing an airbag clamp for securing an airbag onto an inflating tube of an airbag system. An embodiment of the present invention includes a body, a first engaging portion, and a second engaging portion. The body may be capable of surrounding the device, wherein the body may include a first end and a second end that are capable of moving towards each other. The first engaging portion may be located at a first end, wherein the first engaging portion may include at least one plate. The second engaging portion may be located at the second end, wherein the second engaging portion may include at least one plate. The engaging portions may be capable of being fitted together and the plates may be capable of being fastened together to secure the clamp around the material and device.

An embodiment of the present invention includes a method for clamping material to a device. A clamp having two ends may be placed over the material and the device, and then placing said clamp, material and device into an apparatus. The apparatus may then be utilized to move one end of the clamp towards the other end of the clamp into a closed position. The apparatus may also be utilized to secure the ends together around the material and the device. Once secured, the clamp, material and device may be removed from the apparatus.

DETAILED DESCRIPTION

FIGS. 1-6 illustrate a clamp 10 capable of securing an airbag (not shown) to an inflating or injector tube 110 of the airbag system, as shown in FIGS. 7-11. While the clamp 10 is being shown and described in terms of an airbag clamp and system, the clamp 10 as shown is only one embodiment of the present invention and should not be deemed as limiting the clamp 10 to the embodiment shown. For example, the clamp 10 may be of any appropriate shape or thickness without deviating from the spirit of the present invention, such as of a substantially circular shape and a relatively small thickness. However, a person of ordinary skill in the art will appreciate that the clamp 10 may be of may different shapes and have many different dimensions.

As discussed above, the clamp 10 may be of any appropriate shape, such as substantially circular, as shown in FIGS. 1-7, or of any other appropriate shape, such as rectangular, elliptical, square or the like, for example. The clamp 10 may be made of any appropriate type of material including many different combinations or types of materials. For example, the clamp 10 may be made out of metal, such as stainless steel or a lower grade steel, such as a mild carbon based steel. Use of a mild steel may provide substantial cost savings. In addition, while the clamp 10 is shown as a single piece construction, it is to be understood that the clamp 10 could be made out of any number of appropriate pieces and secured together by any appropriate means, such as welding, adhesives or the like, for example.

Due to the strength of the clamp 10, as will be described in more detail below, the clamp 10 may be used with materials that are more elastic than materials used with prior art airbag clamps. Advantageously, the increased elasticity (or flexibility) of the material of the clamp 10 may improve its ability to effectively clamp onto devices, such as an injection tube 110 for an airbag, for example.

The clamp 10 may include a first end 12 and a second end 14. The clamp 10 may have a length, or circumference in a circular embodiment that may be defined between the first end 12 and the second end 14. The clamp 10 may further include a coating 15. The coating 15 may cover any appropriate portion or amount of the clamp 10. The coating 15 may substantially cover the entire clamp 10. The coating 15 may also be of any appropriate color, such as similar color to the material of the clamp 10, or a color distinct from the material of the clamp 10, for example.

In an embodiment utilizing a coating 15 having a color that is different from the material, any undesired manipulation or unauthorized servicing of the clamp 10 may cause scratching, flaking or otherwise removing the coating 15 from the clamp 10. Advantageously, where the coating color is distinct from the color of the clamp 10, any undesired manipulation or unauthorized servicing of the clamp 10 may be readily apparent.

The coating 15 of the clamp 10 may be of any type of appropriate coating known to a person of ordinary skill in the art. In an embodiment, the coating 15 may be an organic coating having a color distinct from the inflating tube, the air bag and the clamp 10. In a preferred embodiment, the coating 15 may be able to stretch with the clamp 10. For example, as the first end 12 and/or the second end 14 is stretched and moved to close and secure the clamp 10 around a device, the coating 15 may remain consistent around the clamp 10.

Figure 3:
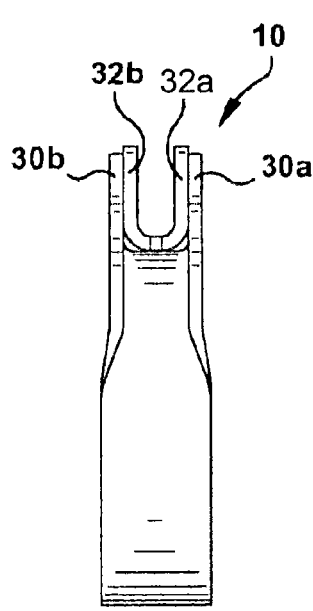
FIG. 3 illustrates a side view of the clamp of FIG. 2.

The clamp 10 may have a width W as best shown in FIG. 3. The width W may be of any appropriate size or dimension. The width W may be determined based on any appropriate means, such as by the strength and size of the device in which the clamp 10 is to be used. In addition, the width W may be a function of the required clamping strength to be imparted with the clamp 10. The width W of the clamp 10 may be tuned to change the residual load of the clamp 10 as a function of the compression load of the clamp 10. Generally, increasing the width W of the clamp 10 may increase the residual clamp load as a function of the compression load. For a predetermined compression load, the greater the width W of the clamp 10 the lower the residual load.

The residual clamp load and the compression load may be determined or limited by the device in which the clamp 10 will be used. For example, if the clamp 10 is used to clamp an airbag to an inflating tube 110, then the inherent strength of the inflating tube 110 may limit the compression load and/or residual clamp load that may be applied by the clamp 10 without damaging the inflating tube 110. Therefore, an analysis of the device in which the clamp 10 will be used may be necessary before tuning the width W of the clamp 10.

Figure 2:
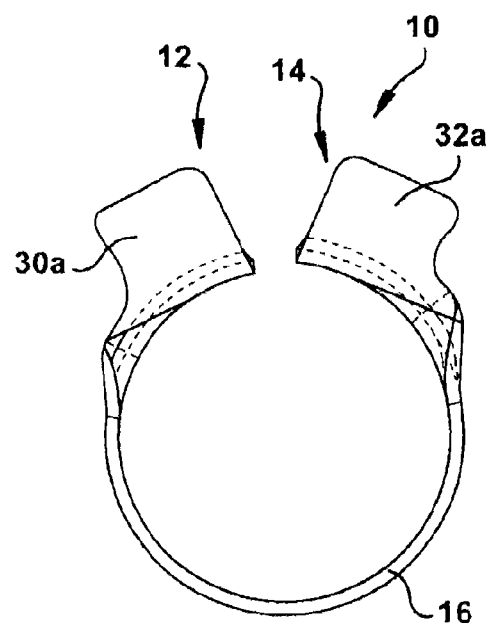
FIG. 2 illustrates a front view of the clamp of FIG. 1 in the open position.

As shown in FIGS. 1-6, the clamp 10 may also include an annular ring portion 16. The annular ring portion 16 may terminate near the first end 12 and the second end 14. The annular ring portion 16 may have any appropriate size and shape diameter, such as a diameter substantially similar in size and shape to the device in which the clamp 10 is to be attached. As shown in FIGS. 1 and 2, the structure of the clamp 10 may permit a relatively large amount of travel or movement prior to being secured in the closed position. Accordingly, the clamp 10 may be easily connectable to a device 110, such as an inflating tube of an airbag system prior to closing the clamp 10.

The clamp 10 may include a first engaging portion 18 and a second engaging portion 20. The first engaging portion 18 and the second engaging portion 20 may be of any appropriate size or shape. In addition, the first engaging portion 18 and the second engaging portion 20 may be of a similar shape or size or of different shapes or sizes. The first engaging portion 18 and the second engaging portion 20 may also be positioned at any appropriate locations on the clamp 10.

Figure 4:
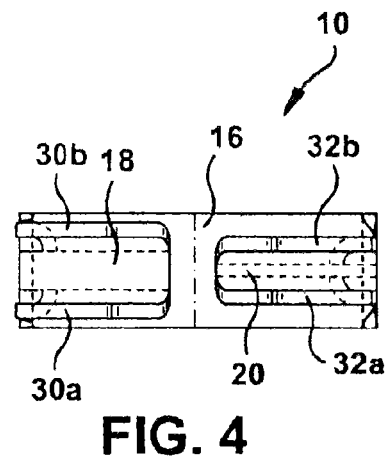
FIG. 4 illustrates a top view of the clamp of FIG. 2.

As shown in FIGS. 3 and 4, the first engaging portion 18 and the second engaging portion 20 may be of a substantially similar shape and size so that the first or second engaging portions 18, 20 may be able to fit and slide within the other engaging portion 18, 20. For example, the first engaging portion 18 may be slightly wider than the second engaging portion 20, so that the second engaging portion 20 may slide within the first engaging portion 18. While shown with the first engaging 18 portion being slightly larger than the second engaging portion 20, it is to be understood that the roles may be reversed so that the second engaging portion 20 is larger than the first engaging portion 18.

The first engaging portion 18 and the second engaging portion 20 may be capable of securing the clamp 10 in a compressed state or closed position. In an embodiment, the first and second engaging portions 18, 20 may be extended portions of the annular ring portion 16 that may be bent to a direction substantially perpendicular to the circumference of the clamp 10. Alternatively, the first and second engaging portions 18, 20 may be molded or otherwise formed at a position substantially perpendicular to the circumference of the clamp 10.

In an embodiment, the first engaging portion 18 may include first plate 30a and a second plate 30b. As best shown in FIG. 1, the plates 30a, 30b and first engaging portion 18 may be of any appropriate shape, such as a general U-shape. The first plate 30a and second plate 30b may be of any appropriate shape or size, such as a generally square, rectangular, semicircular shape or the like, for example. The first plate 30a and the second plate 30b may be positioned at any appropriate location on the clamp 10, such as at the first end 12. The first plate 30a may be opposing the second plate 30b. In such an embodiment, the second engaging portion 20 may include a first plate 32a and a second plate 32b. As best shown in FIG. 1, the plates 32a, 32b and first engaging portion 20 may be of any appropriate shape, such as a general U-shape. The first plate 32a and second plate 32b may be of any appropriate shape or size, such as a generally square, rectangular, semicircular shape or the like, for example. The first plate 32a and the second plate 32b may be positioned at any appropriate location on the clamp 10, such as at the second end 14. The first plate 32a may be opposing the second plate 32b. The first and second engaging portions 18, 20 may be utilized to move the clamp 10 from an open position to the closed position.

While the plates 30a, 30b, 32a, 32b are shown in FIGS. 1, 2 and 5 as having substantially similar shapes and sizes, it is to be understood that each of the plates 30a, 30b, 32a, 32b may have different or corresponding shapes and sizes. For example, plates 30a, 32a may be of a similar shape and size, while plates 30b, 32b may each have a different and unique shape or size. In addition, while shown and discussed in terms of each engaging portion 18, 20 having two plates, it is to be understood that any appropriate number of plates may be utilized, such as one plate per engaging portion 18, 20, and should not be limited to those examples described herein.

As best shown in FIG. 3, the first plate 30a and second plate 30b of the first engaging portion 18 may be slightly more open than the first plate 32a and second plate 32b of the second engaging portion 20. While shown with the plates 30a, 30b of the first engaging portion 18 being more open than the plates 32a, 32b of the second engaging portion 20 it is to be understood that the roles may be reversed. In other words, the plates 32a, 32b of the second engaging portion 20 may be slightly wider open than the plates 30a, 30b of the first engaging portion 18.

In use, the relaxed state or open position may be any position in which the clamp 10 may be removable from the device 110 that it may be clamping, such as the airbag to the injector tube, for example. The compressed state or closed position may be any position in which the clamp 10 is not removable from the device 110 in which it may be clamping. The first and second engaging portions 18, 20 should overlap in the closed position, but may also overlap in an open position.

For example, the first and second engaging portions 18, 20 may be partially overlapped while allowing the clamp 10 to be easily removed from the injector tube 110 of the airbag system. In such an example, the clamp 10 may be in the open position. To move the clamp 10 in such an example to the closed position, the first and second engaging portions 18, 20 may be moved closer to one another such that clamp 10 tightens a predetermined amount on the inflating tube 110 of the airbag system. In an airbag system, the clamp 10 at the closed position may have a diameter substantially equal to that of the injector tube 110.

FIGS. 1-4 illustrate an embodiment of the clamp 10 in the open position. FIGS. 5 and 6 illustrate an embodiment of the clamp 10 in the closed position. In a preferred embodiment, a substantial portion of one of the first or second engaging portions 18, 20 may overlap a substantial portion of the other first or second engaging portion 18, 20 when in the closed position, as best shown in FIGS. 5 and 6.

The first engaging portion 18 and the second engaging portion 20 may be moved such that the plates 30a, 30b of the of the first engaging portion 18 abut the plates 32a, 32b of the second engaging portion 20. In a preferred embodiment, one of the first or second engaging portions 18, 20 may be moved within the other engaging portion 18, 20 as shown in FIGS. 3 and 4.

The clamp 10 may be secured in the closed position by any appropriate means, such as by attaching the plates 30a, 30b, 32a, 32b together by crimping, puncturing, welding, adhesives, fasteners or the like. For example, the plates 30a, 30b, 32a, 32b may be secured by crimping or pinching the plates 30a, 30b, 32a, 32b together. Advantageously, the crimping of the plates 30a, 30b, 32a, 32b may be in a direction substantially perpendicular to the load path of the clamp and the length of the clamp 10. Securing the clamp 10 in the closed position by applying force in a direction substantially perpendicular to the load path may increase the residual clamp load.

In a preferred embodiment, the plates 30a, 30b, 32a, 32b may be fastened to lock or otherwise secure the engaging portions 18, 20 together, such as by puncturing, piercing or the like. It is to be understood that any appropriate number of the plates 30a, 30b, 32a, 32b may be pierced. In a preferred embodiment, all of the plates 30a, 30b, 32a, 32b may be pierced; however, at a minimum one of the plates 30a, 30b, 32a, 32b from each of the engaging portions 18, 20 may be pierced. A resulting pierced portion 50 may be bent into or through a portion of the engaging portions 18, 20 to lock the engaging portions 18, 20.

For example, the plates 30a and 32a may be pierced whereby the pierced portion 50 of the plate 30a may be pushed through or at least partially into the pierced portion 50 of the plate 32a. In one embodiment, the pierced portion 50 of the plate 30a is pushed through the plates 32a and 32b. The pierced portion of any of the plates 30a, 30b, 32a, 32b may be pushed or inserted through any of the other plates 30a, 30b, 32a, 32b so long as the engaging portions 18, 20 are securely locked together. At such a position, the engaging portions 18, 20 may lock the clamp 10 in the closed position to effectively secure and clamp, for example, the airbag to the inflating tube 110. While described in terms of the plates 30a and 32a being pierced, it is to be understood that the opposite may also be true, such that plates 30b and 32b may be pierced whereby the pierced portion 50 of the plate 30b may be pushed through or at least partially into the pierced portion 50 of the plate 32b.

The pierced portion 50 may be moved in any appropriate direction, such as being moved in a direction substantially perpendicular to the direction of the load path of the clamp 10. The load path typically occurs along length of the clamp 10. Therefore, the first and second engaging portions 18, 20 may be engagable and lockable in a direction substantially perpendicular to the length of the clamp 10 and the direction of the load path. The advantages of securing the clamp 10 at a closed position with forces perpendicular to the length of the clamp 10 and the load path are significant.

Figure 12:
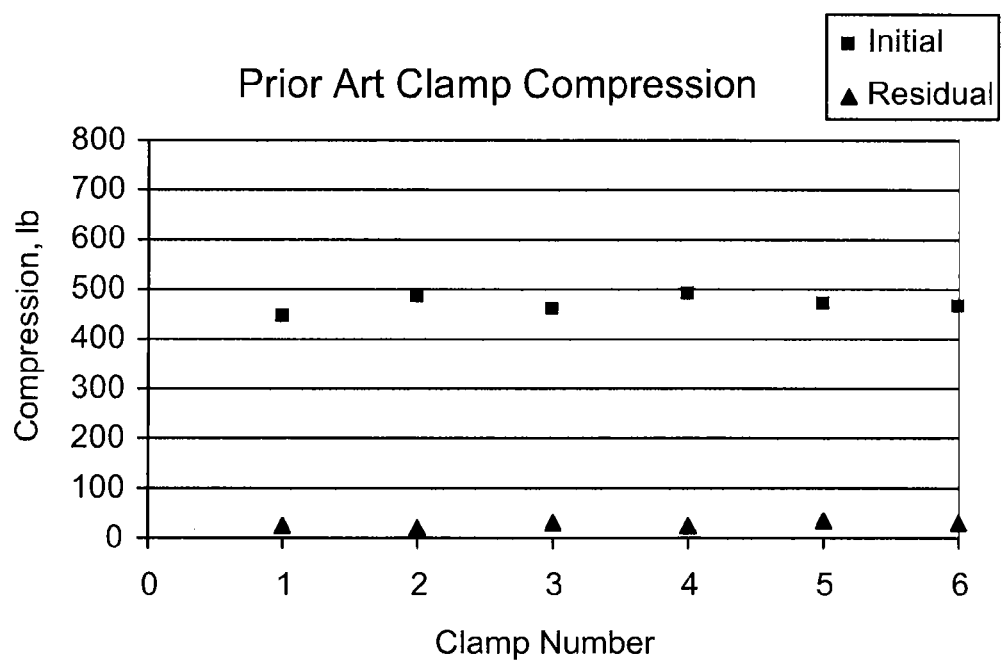
FIG. 12 illustrates the residual load of prior airbag clamps compared to the compression load.
Figure 13:
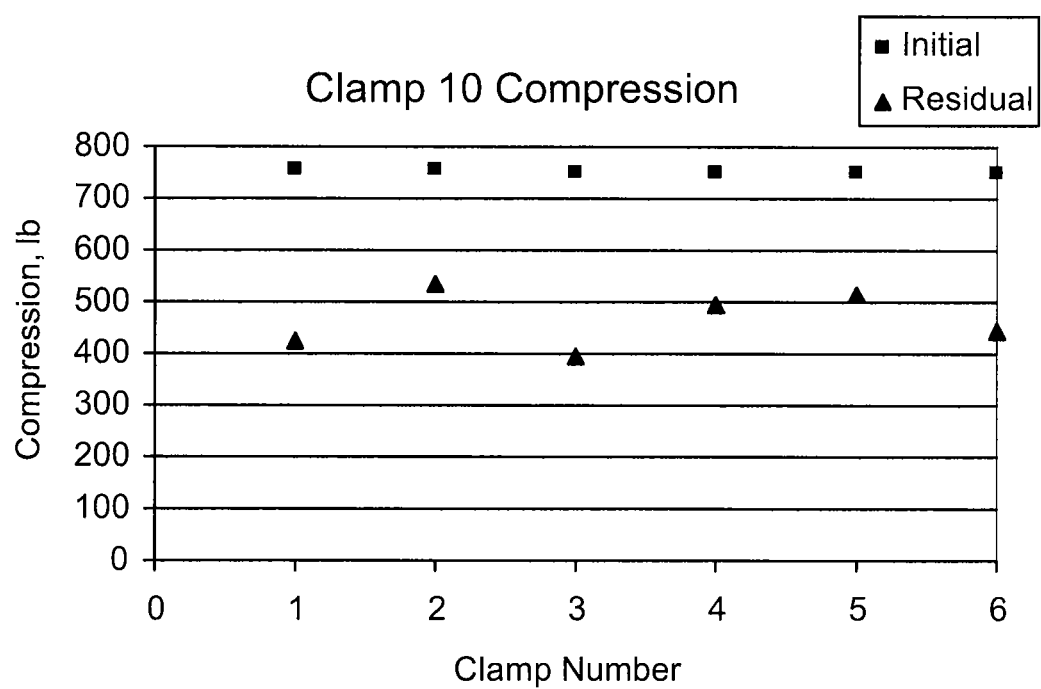
FIG. 13 illustrates the residual load of the clamp compared to the compression load.

FIG. 13 illustrates the residual clamp load as compared to compression load applied to the clamp 10 in an embodiment of the present invention. Comparing FIG. 13 FIG. 12, the clamp 10 has a residual clamp load of more than seventeen times the amount.

Figure 14:
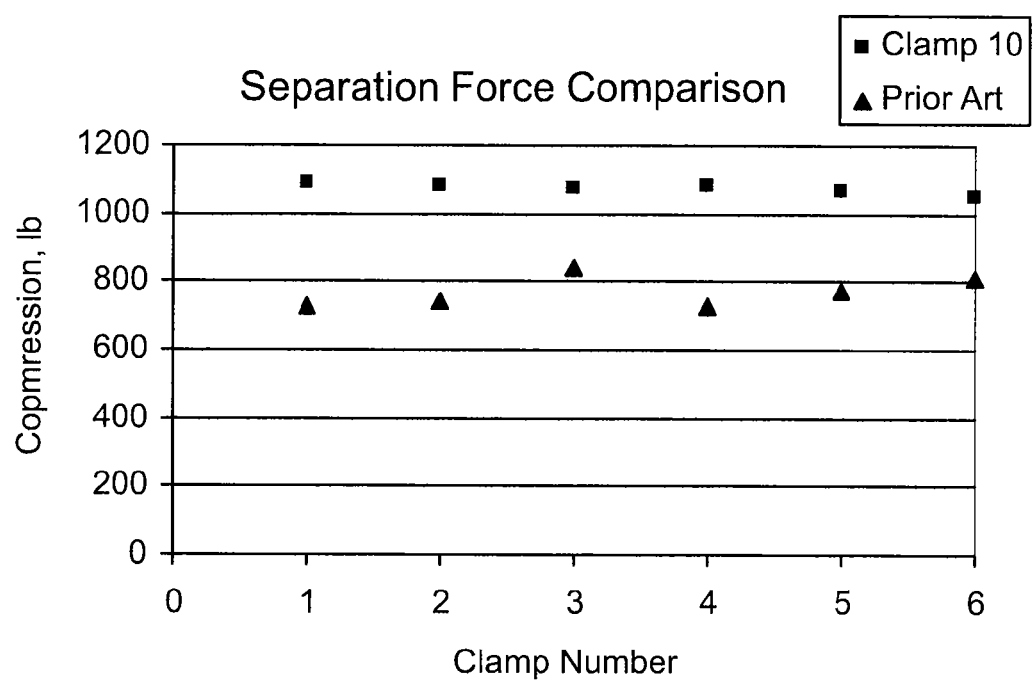
FIG. 14 illustrates a comparison of the separation forces of the clamp and a prior airbag clamp.
Figure 15:
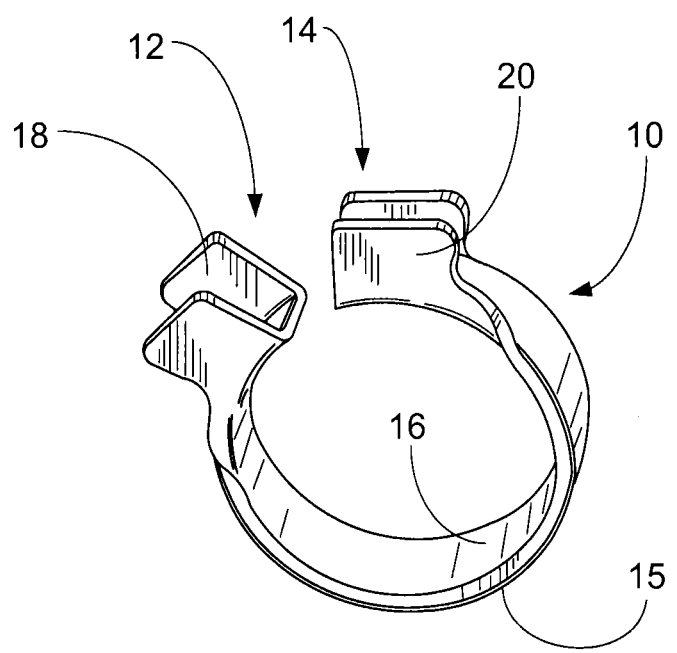
FIG. 15 illustrates a perspective view of a clamp in a relaxed state or open position in an embodiment of the present invention

FIG. 14 illustrates the improvement of the separation force exhibited by the clamp 10 as compared to prior art airbag clamps. In FIG. 14, the max load was set to 1000 lb to prevent damage to the test mandrel pins. The clamp 10 did not separate in any of the tests below but gradually loosened to zero compression. On the other hand, the prior art clamp separated in each case.

FIGS. 7-11 illustrate an embodiment of an assembly tool or apparatus 100 that may be utilized for attaching the clamp 10 to a device, such as an injector or inflating tube 110, for example. The apparatus 100 may be operated by any appropriate means, such by being manually operated, for example, but may preferably be actuated using a computer or processing device (not shown) such that the operation is automated.

The clamp 10 may compress the airbag material onto the inflating tube 110 using approximately 320° of surface area. The clamp 10 may be tightened to a pre-load of any appropriate amount, such as approximately 750 lbs, thereby leaving a residual loan of approximately 400 lbs of clamping force of the airbag material to the inflating tube 110.

Figure 7:
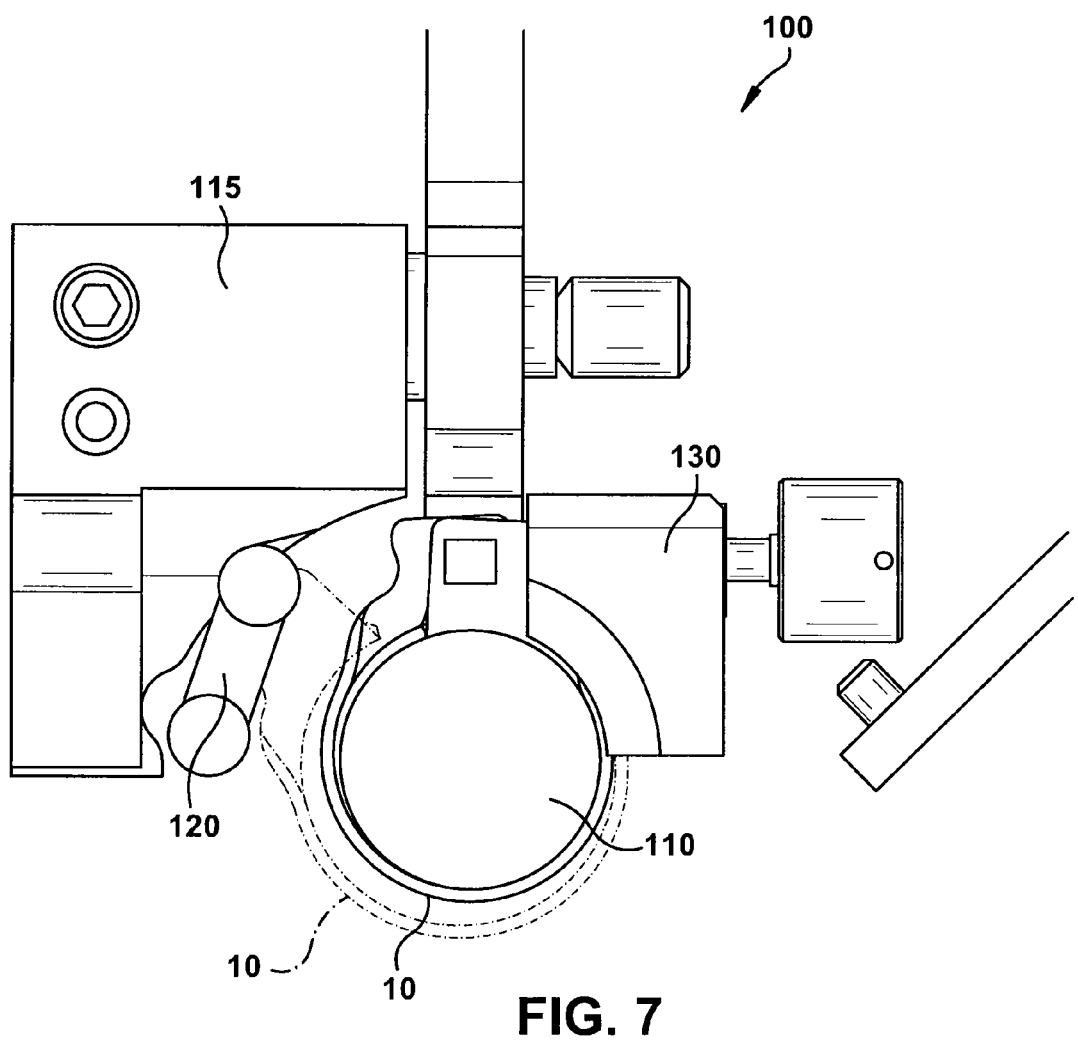
FIG. 7 illustrates a partial view of a device for closing and securing the clamp.
Figure 8:
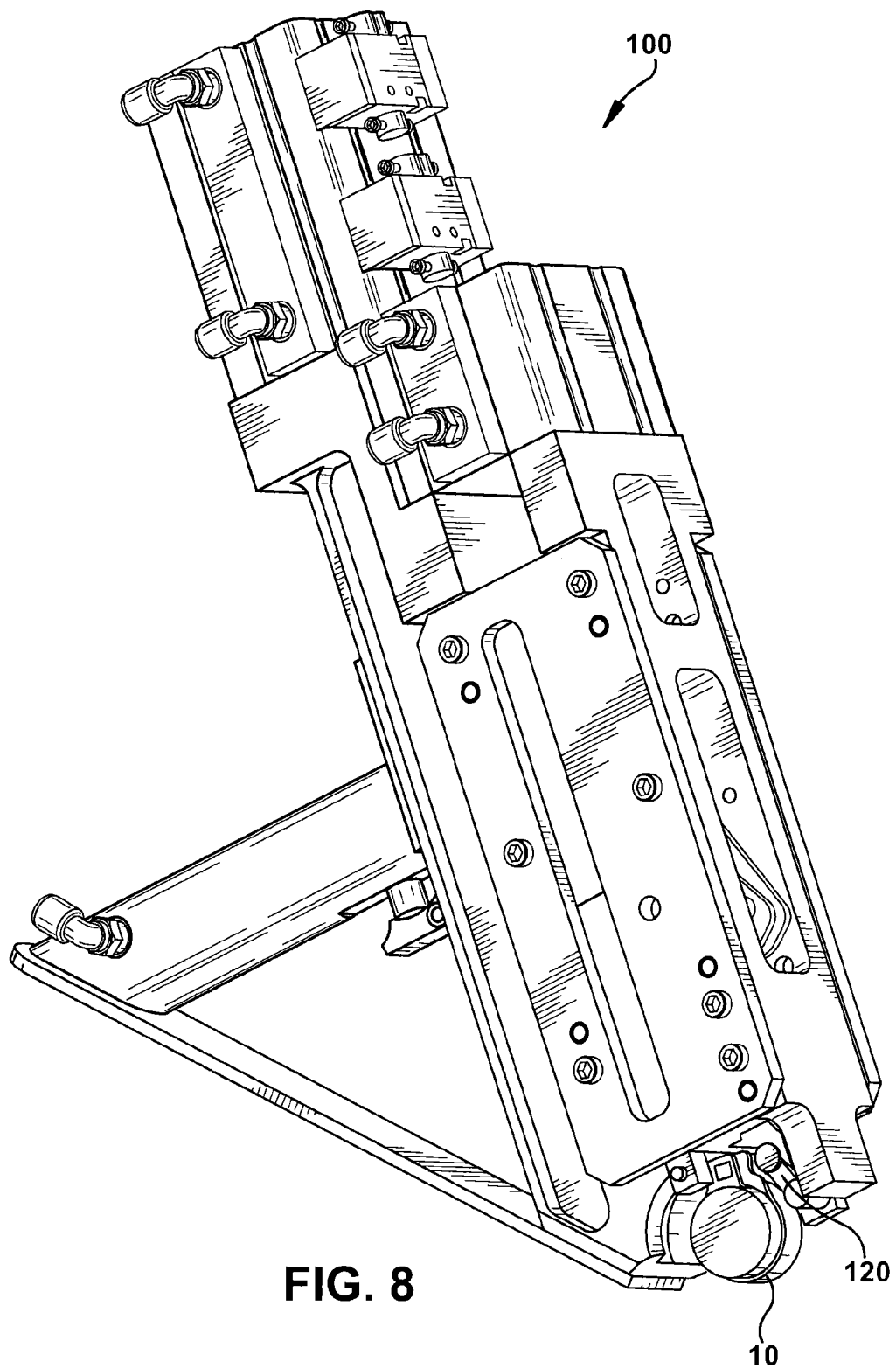
FIG. 8 illustrates a perspective view of the device of FIG. 7 for closing and securing the clamp.

The apparatus 100 may include a first arm 115, a chuck 120, and a second arm 130. The first arm 115, the chuck 120 and the second arm 130 may be of any appropriate type, shape or size. The first arm 115 may move to drive the chuck 120 against the clamp 10, as illustrated in FIG. 7. The chuck 120 may push one of the first or second engaging portions 18, 20 toward the other engaging portion 18, 20 thereby altering the clamp 10 from the relaxed state or open position to the compressed state or closed position. The engaging portion 18, 20 not moved by the chuck 120 may be held stationary by the second arm 130, as best shown in FIG. 7.

The chuck 120 may be connected to load cells (not shown) for measuring the amount of force applied to the first or second engaging portion 18, 20 and/or the amount of spring back force on the engaging portion 18, 20. Load cells (not shown) may also be connected to the second arm 130 to measure the force applied or realized by the locking arm 130 as the engaging portion 18, 20 is moved to the closed position.

Figure 9:
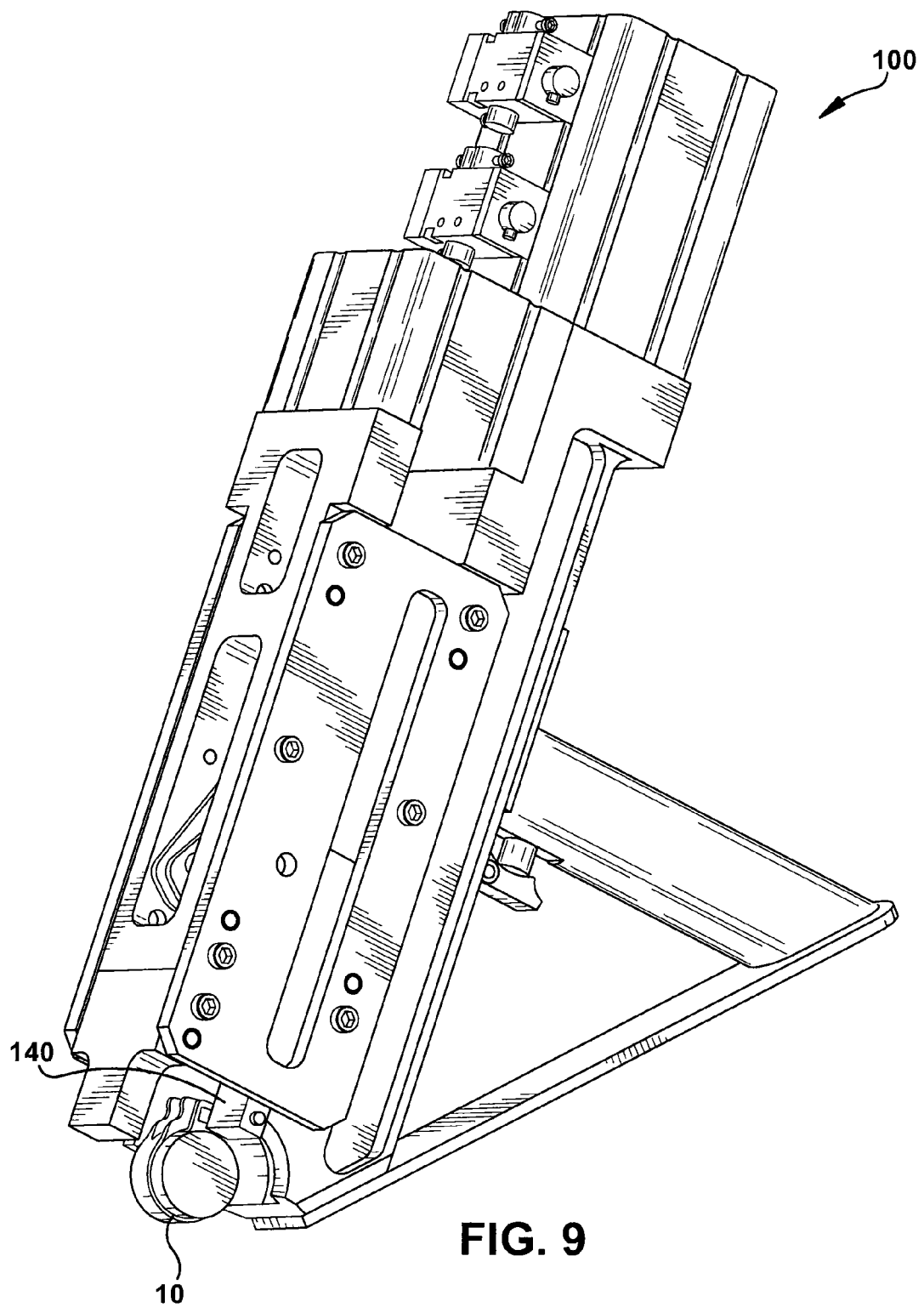
FIG. 9 illustrates a perspective view of the device of FIG. 8 from a side opposite that shown in FIG. 8.
Figure 10:
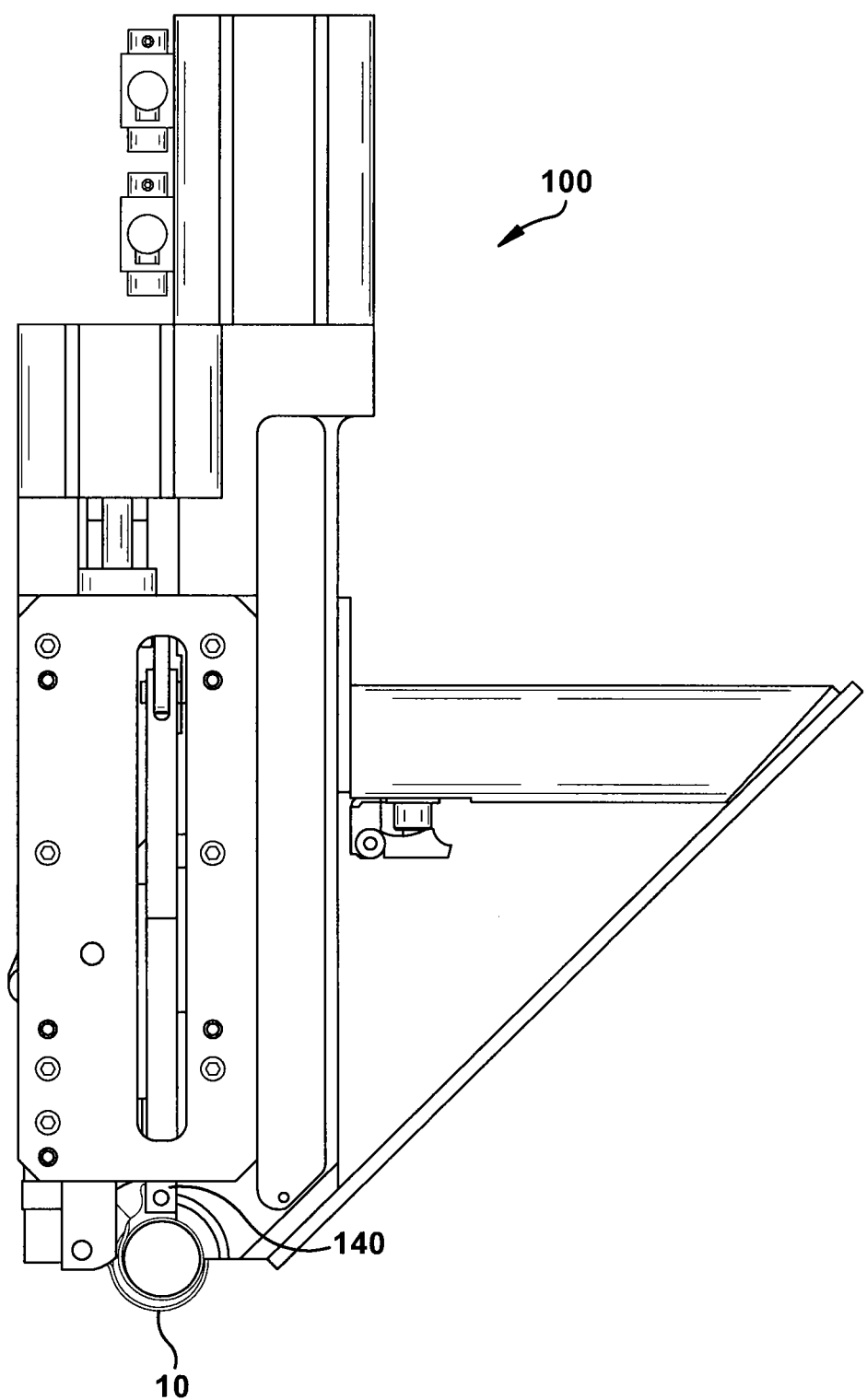
FIG. 10 illustrates a side view of the device of FIG. 8.
Figure 11:
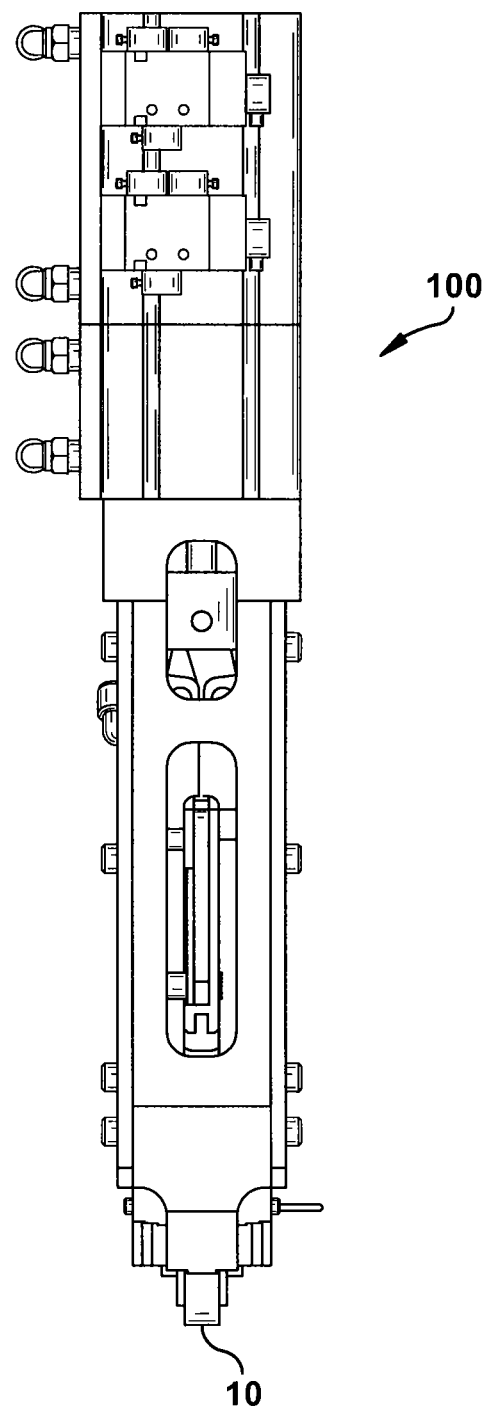
FIG. 11 illustrates a front view of the device of FIG. 8.

The apparatus 100 may also include a locking device 140, as illustrated in FIGS. 9 and 10. The locking device 140 may secure the first and second engaging portions 18, 20 of the clamp 10 by any appropriate means. For example, the locking device 140 may crimp the engaging portions 18, 20 and/or pierce the engaging portions 18, 20 of the clamp 10, as discussed above. The locking device 140 may utilize loading cells (not shown) or other sensing devices to determine the amount of force applied in crimping the engaging portions 18, 20, the distance the engaging portions 18, 20 moved, the resistance force to the crimping exerted by the engaging portion 18, 20, force applied to pierce the engaging portions 18, 20, and the distance in which the pierced portion 50 may be moved by the locking device 140.

The load cells may be connected to a database (not shown) and/or a processor (not shown) for recording the amount of force and the time the force occurred. In an embodiment, the clamp 10 may have an identifier, such as a serial number, inscribed, such as laser inscribed on the clamp 10. The clamp 10 may be identified in relation to the forces recorded by the database. The processor and/or the database may be used to control the amount of force applied to the engaging portion 18, 20 of the clamp 10. For example, use of the load cells, the processor and/or the database permits the apparatus 100 to apply a substantially similar force to each of the engaging portions 18, 20 of the clamps 10.

As discussed above, the clamp 10 may be of any appropriate size, such that the clamp 10 may fit over both the airbag material and the injector tube 110. Once in place over the material and tube 110, one of the first or second engaging portions 18, 20 may be pushed toward the other portion 18, 20 until the appropriate amount of force, such as 750 lbs of force, is applied. After the engaging portions 18, 20 are moved towards each other, a shear or piercing may be placed through the engaging portions 18, 20 thereby locking the clamp 10 in position. The assembly tool or apparatus 100 may then be removed and the clamp 10 is secured and complete.

The apparatus 100 may be of any appropriate type, such as a multi-directional tool for applying an axial load around the circumference of the clamp 10 and then shear or piece the engaging portions 18, 20 through themselves to lock the clamp 10 in place. The shears may be 90° to the load, thereby ensuring a solid one-piece locking clamp 10. In addition, the clamp force may be fully adjustable.

The apparatus 100 may be incorporated into an assembly line where each of the clamps 10 is secured. For example, an airbag may be positioned over the injector tube 110, the clamp may be aligned to secure the airbag to the injector tube 110, and the clamp 10 may be moved from the open position to the closed position via the apparatus 100. The clamp 10 may be locked in the closed position by the locking device 140 of the apparatus 100. The apparatus 100 may be connected to the processor and/or the database to control the forces applied to the clamp 10. The processor and/or the database may record the forces and time in which the forces occurred and link the information to the clamp 10. The resulting data may then be stored and analyzed.

While the present invention is described with reference to embodiments described herein, it should be clear that the present invention is not limited to such embodiments. Therefore, the description of the embodiments herein is merely illustrative of the present invention and will not limit the scope of the invention as claimed.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, the following is claimed:

1. A clamp for securing material to a device, the clamp comprising:

a body configured to surround said device, said body having a first end and a second end, wherein at least one of said first and second ends are configured to move towards the other of said first and second ends in a first direction;

a first engaging portion located at said first end, said first engaging portion including a first pierced portion;

a second engaging portion located at said second end, said second engaging portion including a second pierced portion; and wherein said first or second engaging portions overlaps the other of said first or second engaging portions and said first and second pierced portions are punctured together in a second direction, said second direction being generally perpendicular to said first direction whereby said engaging portions are locked together, said body is secured around said material and device and said body applies a load to said device.

2. The clamp of claim 1, wherein said body is annular and includes a circumference.

3. The clamp of claim 2, wherein said engaging portions are fit together by sliding said second engaging portion within said first engaging portion in said first direction.

4. The clamp of claim 1, wherein said first and second engaging portions each include at least one plate and wherein said first and second pierced portions are positioned on said plates, respectively and are fastened together in said second direction to secure said body around said material and device.

5. The clamp of claim 4, wherein said plates are fastened together by puncturing said plate of said first engaging portion into and through said plate of said second engaging portion.

6. The clamp of claim 2, wherein said first engaging portion is wider than said second engaging portion.

7. The clamp of claim 6, wherein said first engaging portion includes a first plate and a second plate.

8. The clamp of claim 7, wherein said second engaging portion includes a first plate and a second plate.

9. The clamp of claim 1, further including a coating located on said body.

10. The clamp of claim 1, wherein said first engaging portion is generally U-shaped.

11. A clamp comprising:
a body having a circumference;
a first engaging portion adjacent said body, said first engaging portion including a first pierced portion; and
a second engaging portion adjacent said body, said second engaging portion include a second pierced portion, wherein said first engaging portion is overlapped with and attached to said second engaging portion by puncturing said first pierced portion into said second pierced portion along an axis whereby said body applies a load to an item securing said body to the item, and wherein said axis is generally normal to any location along said circumference of said body.

12. The clamp of claim 11, wherein said first and second engaging portions each include at least one plate and wherein said first and second pierced portions are located on said plates, respectively and are attached to secure said body around said item.

13. The clamp of claim 12, wherein said plates are attached by puncturing said first pierced portion of said plate of said first engaging portion into and through said second pierced portion of said plate of said second engaging portion.

14. The clamp of claim 11, wherein said first engaging portion includes a first plate and a second plate and said second engaging portion includes a first plate and a second plate.

15. The clamp of claim 14, wherein said first pierced portion of said first plate of said first engaging portion is attached to said second pierced portion of said first plate of said second engaging portion by puncturing said first plate of said first engaging portion into and through said first plate of said second engaging portion and said second plate of said first engaging portion is attached to said second plate of said second engaging portion by puncturing said second plate of said first engaging portion into and through said second plate of said second engaging portion.

16. A clamp comprising:
a body having a length and a width, wherein said length is greater than said width;
a first engaging portion formed with said body, and including a first pierced portion;
a second engaging portion formed with said body and including a second pierced portion, wherein said body applies a load to an item securing said body to said item when said first and second engaging portions are attached; and
wherein one of said first and second engaging portions overlaps the other of said first and second engaging portions, said first and second engaging portions are attached by puncturing said first and second pierced portions together in a plane generally normal to said length of said body and generally parallel to said width of said body.

17. The clamp of claim 16, wherein said first and second engaging portions are attached by puncturing at least a portion of said first pierced portion into and through said second pierced portion.

18. The clamp of claim 16, wherein said first and second engaging portions each include at least one plate and wherein said first and second pierced portions are located on said plates are attached by puncturing said first pierced portion of said plate of said first engaging portion into and through second pierced portion of said plate of said second engaging portion.

19. The clamp of claim 11, wherein said first and second engaging portions are integrally formed with said body.

20. The clamp of claim 1, wherein said body includes a circumference and a width, and wherein said engaging portions are engaged and locked together in a direction generally perpendicular to said circumference and generally parallel to said width to secure said body around said material and device.

21. The clamp of claim 11, wherein said first engaging portion is attached to said second engaging portion in a plane generally normal to said load applied by said body.

22. The clamp of claim 16, wherein said load is an annular load applied to said item and wherein said first and second engaging portions are attached in a plane generally normal to said annular load applied by said body.

23. The clamp of 22, wherein said width of said body directly correlates to said annular load applied to said item.

24. The clamp of claim 23, wherein increasing said width increases said annular load applied to said item.

25. The clamp of claim 2, wherein said second direction is generally perpendicular to said circumference of said body.

* * * * *